Aug. 28, 1945. S. H. HAHN 2,383,645
VIBRATION ISOLATION
Filed Sept. 16, 1942
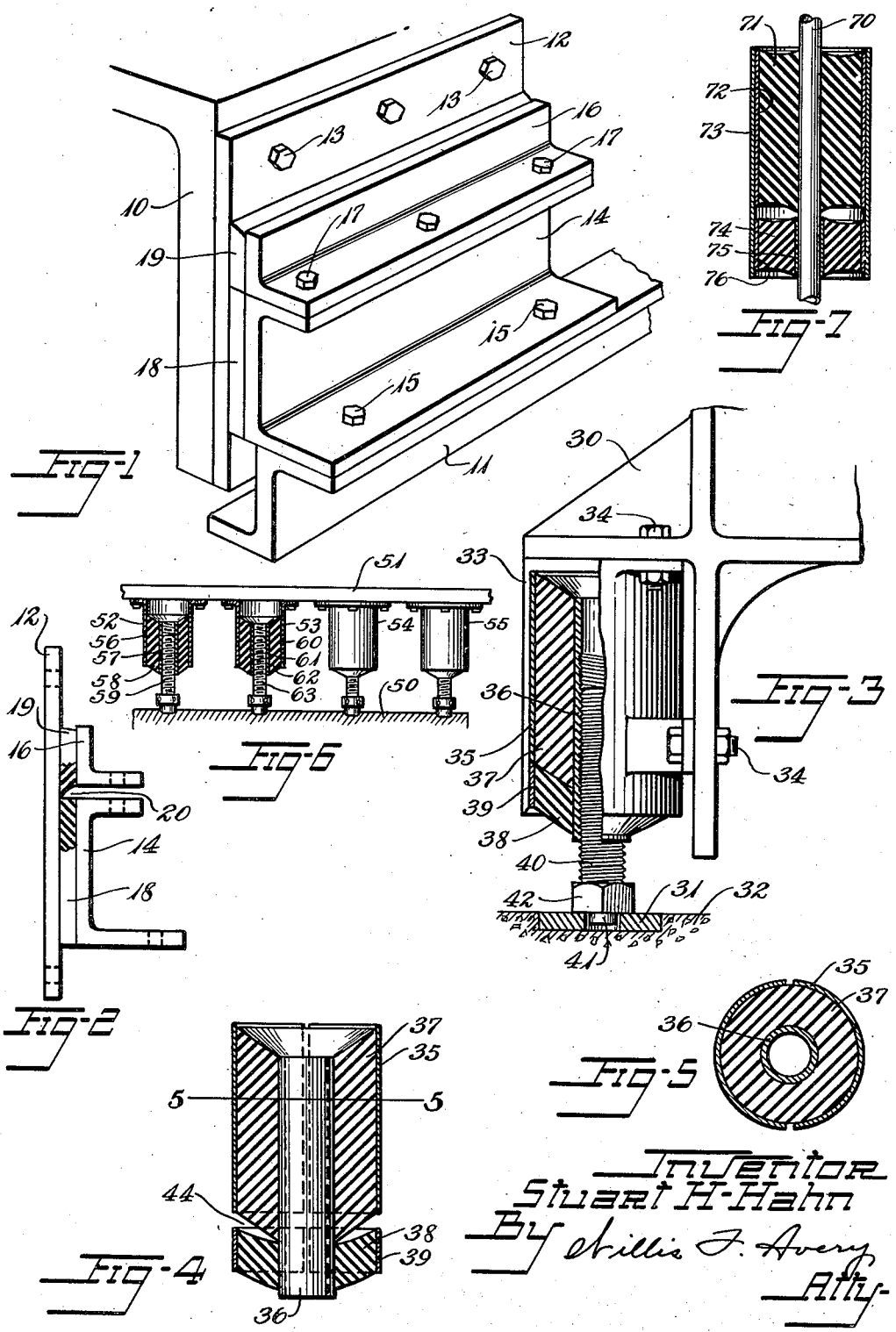

Patented Aug. 28, 1945

2,383,645

UNITED STATES PATENT OFFICE 2,383,645

VIBRATION ISOLATION

Stuart H. Hahn, Williamsville, N. Y., assignor to The B. F. Goodrich Company, New York, N. Y., a corporation of New York Application September 16, 1942, Serial No. 458,588

11 Claims. (Cl. 248—358)

This invention relates to the isolation of vibration and is especially useful in isolating vibration in installations of machines or instruments, although the invention is useful in other springing arrangements, as well, including vehicle suspensions.

It has been found that generally rubber compositions having the characteristic of low hysteresis and therefore low damping ability have also a low tendency to creep or take permanent set under load, which is beneficial in springing bodies. Again, compositions which have high hysteresis and therefore good damping ability exhibit a high tendency to creep or to take permanent set under load which is objectionable in load-supporting bodies. The qualities of low creep and good damping have not been available in the same composition, and have required compromise in selecting the rubber composition for particular applications.

The principal objects of the invention are to provide a mounting structure having high vibration damping with low tendency to creep or to take permanent set, to combine the advantages of low and high hysteresis compositions in a single vibration damping installation, and to provide for convenience of assembly and economy of manufacture. A further object is to provide for supporting the load by the main springing body while substantially relieving the damping body from the load.

These and other objects will appear from the following description and the accompanying drawing.

Of the drawing,

Fig. 1 is a perspective view of a shear type vibration isolating unit constructed according to and embodying the invention, parts being broken away, the unit being mounted under normal static load.

Fig. 2 is an end view thereof, partly broken away and partly in section and not under static load.

Fig. 3 is a side elevation, partly broken away and partly in section, of another form of the invention under normal static load.

Fig. 4 is an axial section of the same without the supporting and supported members, and not under load.

Fig. 5 is a cross section thereof taken on line 5—5 of Fig. 4.

Fig. 6 is a side elevation, partly in section, of a modification of the invention.

Fig. 7 is a longitudinal section of a further modification.

In accordance with the invention cushioning bodies of rubber or other suitable material of high and low hysteresis characteristics so as to give respectively good damping and good springing are utilized in combination, preferably in such a manner that the body of low hysteresis is capable of supporting the load in large measure or entirely and the other body is entirely or partly relieved of such load and is available for damping without the tendency of being subject to excessive creep.

Referring to the drawing, and first to the embodiment of Figs. 1 and 2 thereof, the numeral 10 designates a body, such as a machine frame, subject to vibration, and 11 designates a supporting rail. The vibration isolating support comprises a metal plate 12 secured by bolts 13 to the body 10, a supporting channel member 14 secured by bolts 15 to the rail 11, an angle member 16 secured to the top flange of the metal channel 14 by bolts 17, a body 18 of vulcanized resilient rubber or other rubber-like material having low hysteresis characteristics secured as by a vulcanized bond to the plate 12 and channel 14 and located therebetween, and a second body 19 of vulcanized rubber or other rubber-like material having high hysteresis characteristics secured as by a vulcanized bond to the plate 12 and the angle 16 and located therebetween. In the unloaded position of the rubber bodies, or the position in which they are molded, a space 20 is provided between the bodies 18 and 19 and between the angle 16 and the channel 14. The body 18 is preferably made of sufficient dimensions to support the entire static load in shear and when so loaded, the space 20 is closed by distortion of the body 18 under shear load. The bolts 17 are then inserted to clamp the angle 16 securely to the channel 14 with the body 18 loaded and the body 19 substantially without load. In the unloaded condition the bodies are held in a condition of opposing stress by the bolts 17. When the body 10 is vibrated vertically both bodies 18 and 19 are subjected to shear loading and the body 18 of low hysteresis characteristics principally supports the load while the body 19 of high hysteresis characteristics acts to damp out vibration by absorption of energy due to hysteresis.

Referring to Figs. 3 to 5, the numeral 30 designates a machine frame and 31 a metal washer embedded in a concrete supporting floor 32. A hollow downwardly facing cup 33 is attached to the frame 30, as by bolts 34. The vibration isolating unit comprises a split annular metallic shell 35, a smaller metallic bushing 36 concentric therewith and a body 37 of rubber-like material therebetween and bonded thereto. A shorter split annular metallic bushing 39 having the same circumference as the bushing 35 is located therebelow and is bonded to a second body 38 of rubber-like material which is also bonded to the bushing 36. The body 37 has low hysteresis characteristics and is preferably of sufficient dimensions to sustain the entire static load whereas the body 38 is of high hysteresis characteristics and is used for damping vibration. Bushings 35 and 39 are forced into the cup 33 so as to compress the rubber bodies 37, 38 circumferentially. The load is supported in shear by bushing 36 and this may be threaded internally to adjustably received a leveling screw 40. The screw has a reduced end 41 adapted to engage the aperture of the washer 31, and a polygonal head 42 whereby it may be rotated to adjust and level the machine.

In forming the vibration isolating unit, a space 44 is provided between bushings 35 and 39 and the bodies 37 and 38 so that when the unit is placed under the static load, the load may be assumed by the body 37 and deflection thereof may occur under such load before the bushing 35 is brought into contact with bushing 39. If the load is lifted, the bodies will be in a condition of opposing stress.

In the form of the invention shown in Fig. 6, the supporting surface is designated by the numeral 50 and the supported machine by the numeral 51. The machine is supported in shear by a plurality of vibration isolating units 52, 53, 54, 55. Each of the units 52, 54 comprise an outer bushing 56 of metal, an inner bushing 57 of metal and an annular body 58 of soft rubber-like material having a low hysteresis characteristic therebetween and bonded thereto, an adjusting screw 59 supporting the inner bushing from the supporting surface 50.

Each of the units 53, 55 comprises an outer bushing 60 of metal, an inner bushing 61 of metal and a body 62 of soft rubber-like material having a high hysteresis characteristic is located therebetween and bonded thereto, an adjusting screw 63 being threaded to engage the inner bushing and support it from the supporting surface 50. The arrangement is such that some of the isolating units are of rubber-like material having a low hysteresis characteristic and adopted fully to support the static load in shear, and the others are of rubber-like material having a high hysteresis characteristic and adopted to damp vibration by shear loading. While the bushing type of isolating unit is shown, units of flat shear type somewhat like the unit of Fig. 1 may be used, if desired.

The invention is applicable also to mountings or springs of the circular shear or torsion type, as in the embodiment of Fig. 7, which is suitable, for example, for use as a spring in a vehicle suspension. A central shaft 70 has vulcanized upon it a cylindrical body 71 of rubber composition of low hysteresis type which is secured as by a vulcanized bond to an outer shell 72, preferably split so as to be compressible into an outer sleeve or housing 73 in a manner such that rotation of the shaft and housing, one with respect to the other, is resisted by the body 71 in circular shear. For damping the springing action a second cylindrical body 74 of high hysteresis material is mounted upon the shaft 70 and within the housing 73. The body 74 may have inner and outer sleeves 75 and 76 secured to it as by a vulcanized bond, so as to facilitate introduction of this body into the assembly after the springing body 71 has been inserted and preferably while body 71 is stressed in rotation to its normal load position, in which position the body 74 is secured in place in an unstressed condition or substantially so. This operation can be carried out during manufacture of the spring, in which case the bodies will oppose each other in stress, or during mounting of the spring in the vehicle or other structure, and has the result, as hereinabove discussed with reference to the other illustrated embodiments, of permitting the main springing body to relieve the other body of load-supporting stress so that the second body can serve in its damping capacity without being subject to objectionable creep.

In all the illustrated embodiments of the invention the low hysteresis rubber-like composition is preferably of soft vulcanized natural rubber composition, although some synthetic compositions are suitable, in the characteristic of having little tendency to creep or to assume permanent set. The high hysteresis rubber-like composition is preferably a natural or synthetic rubber composition or of polymerized vinyl chloride material, "Thiokol" material or other suitable rubber-like composition having high hysteresis, as such materials have been found superior to natural rubber compositions for damping vibrations while inferior to natural rubber compositions for supporting a load because they have considerable creep or permanent set.

The combination of high hysteresis material and low hysteresis material in a single installation provides the high vibration damping properties of one and the high resistance to permanent set of the other and provides for absorption and damping of vibration over a broader band of frequencies than would be possible where only one of the materials is employed. This is particularly true where the initial stress of the low hysteresis material is sufficient to carry the entire static load so that the damping material is relieved of such load.

Variations can be made without departing from the scope of the invention as it is defined by the following claims.

I claim:

1. Vibration-isolating apparatus comprising a load-supporting body of rubber-like material having a low hysteresis characteristic for sustaining a load from a support, and a body of rubber-like material having a high hysteresis characteristic for damping vibrations between the load and its support, and means for mounting said bodies between the load and its support in vibration-receiving relation thereto, including means for mounting said body of low hysteresis under load-supporting stress and said body of high-hysteresis in relation to be thereby at least partially relieved of load-supporting stress.

2. Vibration-isolating apparatus comprising a load-supporting body of resilient vulcanized rubber composition having a low hysteresis characteristic for sustaining a load from a support, and a body of rubber-like material having a high hysteresis characterisitc for damping vibrations between the load and its support, and means for mounting said bodies between the load and its support in vibration-receiving relation thereto, including means for mounting said body of low hysteresis in load-supporting relation and said body of high hysteresis in relation to be substantially relieved of the load.

3. Vibration-isolating apparatus comprising relatively movable flat plate-like members for the support of a load, a body of rubber-like material having a low hysteresis characteristic located for shear loading between said members and secured thereto, and a body of rubber-like material having a high hysteresis characteristic also located between said members and secured thereto.

4. Vibration-isolating apparatus comprising a shear mounting having relatively movable members for the support of a load, and rubber-like bodies arranged between said members for shear distortion and bonded thereto, said bodies comprising a body of material having low hysteresis characteristics and a body of material having high hysteresis characteristics.

5. Vibration-isolating apparatus comprising a mounting having concentric inner and outer members, and bodies of rubber-like material arranged between said members for shear distortion and secured thereto, said bodies comprising a load-carry body of low hysteresis material, and a vibration damping body of high hysteresis material.

6. Vibration-isolating apparatus comprising relatively movable structures for the support of a load, a load-supporting body of rubber-like material interposed between said structures and secured thereto, and a damping body of flexible material interposed between said structures and secured thereto, said bodies being mounted in such relation to the structures that when the load-supporting body is in load-supporting condition it substantially relieves the damping mounting from such load.

7. Vibration-isolating apparatus as defined in claim 6 in which said bodies are mounted for movement of said structures through shear stress of said bodies.

8. Vibration-isolating apparatus as defined in claim 6 in which said bodies are mounted for movement of said structures through shear stress of said bodies, and the portions of said bodies at one of said structures are mounted in a condition of opposing stress.

9. Vibration-isolating apparatus as defined in claim 6 in which said bodies are mounted for movement of said structures through shear stress of said bodies, and one of said structures comprises relatively movable parts and means for holding said parts in positions for opposing stress of said bodies.

10. A resilient vibration-isolating mounting comprising a load-transmitting member, a body of rubber-like material secured to said member and projecting therefrom, a second body of rubber-like material of higher hysteresis characterisitc than the first disposed to one side of the first said body and secured to said member and projecting therefrom, and load-transmitting means including elements secured to and connecting the projecting bodies in a manner to impose less load on the said second body than on the first said body while vibration is transmitted to both bodies.

11. Vibration-isolating apparatus for sustaining a load from a support comprising a loading structure, a supporting structure, a body of rubber-like material secured to said structures and having a low hysteresis characteristic for supporting the loading structure from the supporting structure by shear loading of said body, and a body of rubber-like material secured to said structures and having a high hysteresis characteristic for damping vibrations by shear stressing thereof between the loading and supporting structures.

STUART H. HAHN.